(12) United States Patent
Fujita et al.

(10) Patent No.: US 6,806,939 B2
(45) Date of Patent: Oct. 19, 2004

(54) DISPLAY DEVICE

(75) Inventors: Hiroyuki Fujita, Chiba (JP); Katsuki Matsushita, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/357,710

(22) Filed: Feb. 4, 2003

(65) Prior Publication Data

US 2003/0117557 A1 Jun. 26, 2003

Related U.S. Application Data

(62) Division of application No. 09/609,185, filed on Jun. 30, 2000.

(30) Foreign Application Priority Data

Jul. 2, 1999 (JP) .......................................... 11-188516
Jun. 29, 2000 (JP) ........................................ 2000-196544

(51) Int. Cl.[7] .......................... G02F 1/1345; G02G 3/36
(52) U.S. Cl. ....................... 349/152; 349/150; 349/151; 345/104
(58) Field of Search ................................. 349/150, 151, 349/152, 140, 149; 345/104

(56) References Cited

U.S. PATENT DOCUMENTS 5,274,482 A * 12/1993 Morita et al. ................. 359/54
5,477,357 A * 12/1995 Sozuki et al. ................. 359/67
5,712,493 A * 1/1998 Mori et al. .................... 257/59
5,831,387 A * 11/1998 Kaneko et al. ............. 313/495
5,949,502 A * 9/1999 Matsunaga et al. ........... 349/40

FOREIGN PATENT DOCUMENTS

JP         07094852 A   *   4/1995
JP         11015009 A   *   1/1999

* cited by examiner

Primary Examiner—Dung T. Nguyen
Assistant Examiner—Hoan Nguyen
(74) Attorney, Agent, or Firm—Adams & Wilks

(57) ABSTRACT

A display device having an insulating substrate on which transparent electrodes having display electrode portions and wiring electrodes portions are formed, and another substrate opposed to the insulating substrate. At a portion of the insulating substrate at which the wiring electrode patterns extend across a contour line of the opposing substrate, the wiring electrode patterns are set perpendicular to the end surface of the opposing substrate. Dummy patterns may be provided outside the opposite-end terminal patterns in the group of wiring electrode patterns. In the thus-arranged display device, when the wiring electrodes are plated after assembly of a display element, a short circuit cannot occur on the insulating substrate portion at which the wiring electrode patterns extend across the contour line of the opposing substrate. Pads for contact with a short check probe are arranged in a straight line on the insulating substrate. A low-priced straight probe can therefore be used for a short circuit check.

9 Claims, 4 Drawing Sheets (a)

DISPLAY DEVICE

This application is a divisional of Ser. No. 09/609,185, filed on Jun. 30, 2000.

BACKGROUND OF THE INVENTION

The present invention relates to a display device in which wiring portions of transparent electrodes are metallized, to a display device in which semiconductor chips are mounted based on a chip-on-glass (COG) method, and to a method for inspecting a display panel used in the display device.

A manufacturing method has been devised for the manufacture of a so-called COG type display device in which surfaces of terminal electrodes of a display element are metallized by plating and a semiconductor chip is mounted on the metallized surfaces of the electrodes. This manufacturing method provides a simple means for reducing the resistance value of the terminal electrodes, and therefore achieves, at a low cost, a reduction in the frame area based on the use of fine terminal patterns as well as an improvement in connection reliability.

FIGS. 2A and 2B schematically illustrate a conventional COG type display device. FIG. 2A is a top view of a glass substrate 1 on which the display device is formed, and FIG. 2B is a cross-sectional view of the display device.

Transparent electrodes are formed of an indium tin oxide (ITO) film on the glass substrate 1. The transparent electrodes are patterned in predetermined shapes according to the data to be displayed. Portions of the transparent electrodes are sorted as display electrode portions 4 and wiring electrode portions 6 according to their functions. The glass substrate 1 and an opposing substrate 2 opposed to the glass substrate 1 are attached to each other by a sealing material, with a spacing of about 5 to 7 µm therebetween. A liquid crystal 5 is injected into the spacing and contained in the same in a sealed manner, thus forming a liquid crystal panel.

Pads 7 are formed on terminal end of the wiring electrode portions 6 corresponding to output and input terminal electrodes of a semiconductor chip. The wiring electrodes 6 are laid obliquely with respect to a contour line of the display panel to connect the display electrode portions 4 and pads 7 respectively arranged with different pitches. That is, on a portion of the glass substrate 1 at which the wiring electrodes 6 extend across an end surface of the opposing substrate 2, the wiring electrodes 6 are formed so as to be oblique with respect to the end surface of the opposing substrate 2. Similarly, on a portion of the opposing substrate 2 at which wiring electrodes (not shown) on the opposing substrate 2 extend across an end surface of the glass substrate 1, the wiring electrode on the opposing substrate 2 are formed so as to be oblique with respect to the end surface of the glass substrate 1. As wiring electrodes 6, some electrode groups may be formed depending upon electrode layout artwork. As described above, along an opposing substrate contour line 14 along which a plane defining the end surface of the opposing substrate 2 meets the surface of the glass substrate 1, wiring electrodes 6 exist on some portions of the glass substrate 1 and no wiring electrodes 6 exist on the other portions of the glass substrate 1.

The wiring electrodes formed as described above are selectively plated by nonelectrolytic nickel plating. That is, the wiring electrodes exposed outside the liquid crystal panel (on the glass substrate 1 outside the opposing substrate contour line 14) are selectively plated by nonelectrolytic nickel plating.

As described above, the wiring electrodes 6 are oblique with respect to the opposing substrate contour line at the portion of the glass substrate 1 at which the wiring electrodes 6 extend across the end surface of the opposing substrate 2. The plating liquid has different angles of contact on the ITO surface and the glass substrate surface. That is, the plating liquid has a smaller angle of contact on the ITO surface, and the ITO surface is easy to wet. In contrast, the plating liquid has a lager angle of contact on the glass surface than that on the ITO surface, and the glass surface repels the plating liquid in comparison with the ITO surface. For this reason, the plating liquid can remain easily at a step formed by the glass substrate 1 and the opposing substrate 2 (on the glass substrate portion close to and outside the end surface of the opposing substrate 2) and between an adjacent pair of the wiring electrodes, covering the glass portion where no wiring electrode portion exists. In particular, as shown in FIG. 2A, plating liquid 9 can remain easily between the outermost wiring electrode in the wiring electrode group and another of the wiring electrodes adjacent to the outermost one. A bridge 10 of a nickel thin film can thus form along the periphery of the mass of remaining plating liquid 9 between the wiring electrodes.

After plating, therefore, it is necessary to perform a short circuit check with a probe or to check the existence/absence of such a bridge and to identify a bridging place by image recognition or the like. If one of the formed liquid crystal display elements has a bridge 10, it is necessary to repair a bridged portion by using laser or the like.

In the construction of the conventional liquid crystal display device, as described above, a short circuit can occur easily between wiring electrodes at the time of plating after the assembly of the display panel. Therefore, there is a need to check the existence/absence of such a short circuit. However, a high-priced probe is required for checking because the wiring electrode portions and the pads are arranged with small pitches.

SUMMARY OF THE INVENTION

In view of the above-described problems, it is an object of the present invention to provide a liquid crystal display device in which the possibility of a short circuit occurring by means of a plating bridge between wring electrodes is reduced, and in which a short circuit check can be performed by using a low-priced straight probe.

To achieve this object, according to one aspect of the present invention, there is provided a liquid crystal display device having a display element in which, at a portion of an insulating substrate at which a bridge short circuit can occur particularly easily, and at which wiring electrodes on the insulating substrate extend across an end surface of an opposing substrate, the wiring electrodes are formed so as to be perpendicular to the end surface of the opposing substrate.

In another aspect of the present invention, an additional dummy pattern is provided outside the wiring electrodes between which the possibility of occurrence of a bridge short circuit is highest.

In still another aspect of the present invention, probe pads for contact with a probe used for a short circuit check in the liquid crystal display are formed by being arranged in a straight row such that the probe can be simple in structure and can be manufactured at a low cost.

DESCRIPTION OF THE PREFERRED EMBODIMENTS

Figure 1A:
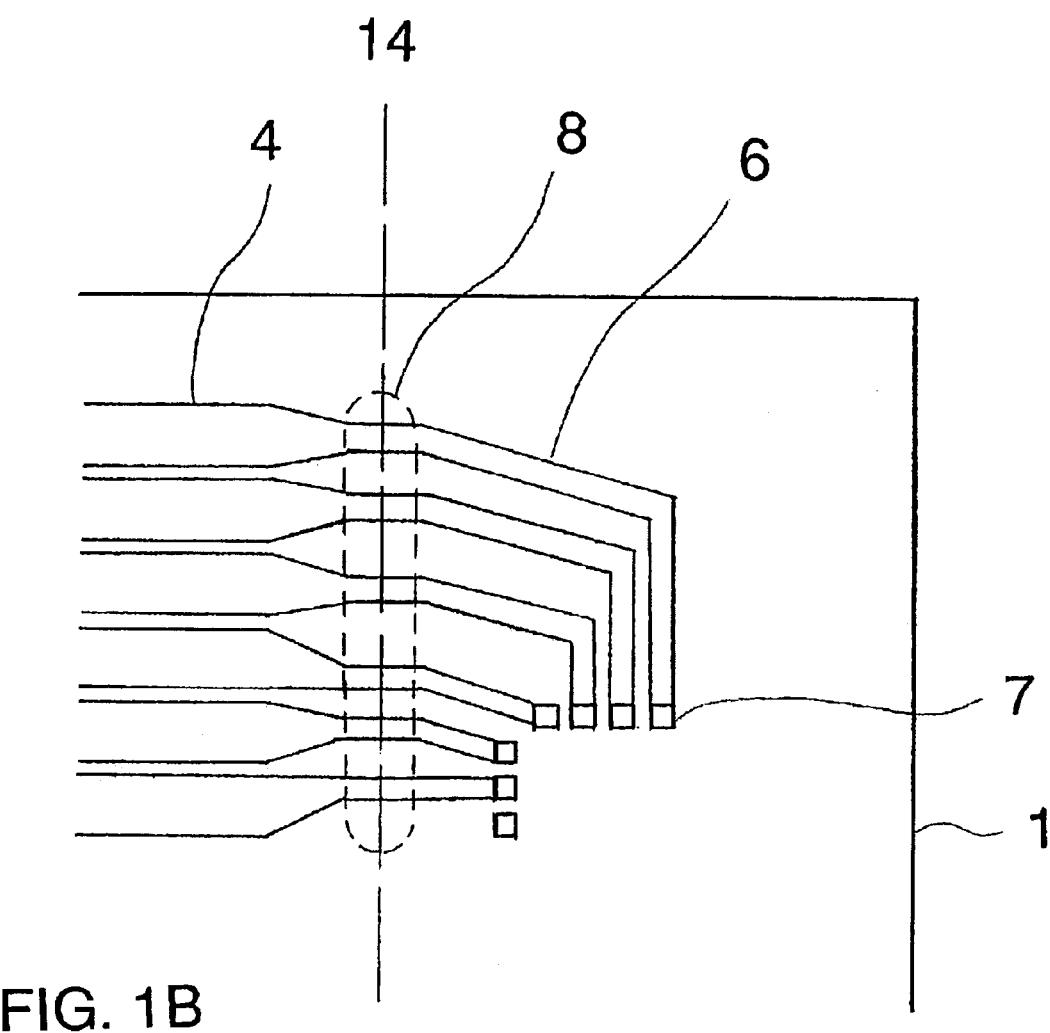
FIG. 1A is a schematic top view of a glass substrate 1 constituting a liquid crystal display element in accordance with a first embodiment of the present invention.

The construction of a display device in accordance with a first embodiment of the present invention will be described below. The display device of the present invention has an insulating substrate on which display electrodes and wiring electrodes are formed, an opposing substrate opposed to the insulating substrate, and a display material contained in a spacing between the insulating substrate and the opposing substrate in a sealing manner. Each of portions of the wiring electrodes extending across a contour line of the opposing substrate is formed perpendicular to the contour line of the opposing substrate.

In the thus-arranged display device, when the wiring electrodes are metallized by plating, the possibility of occurrence of a short circuit between the wiring electrodes due to a residue of a plating liquid in a place where the wiring electrodes extend across the opposing substrate end surface is low.

A display device in accordance with a second embodiment of the present invention includes: an insulating substrate on which display electrodes and a plurality of wiring electrodes are formed; an opposing substrate opposed to the insulating substrate; and a display material contained in a spacing between the insulating substrate and the opposing substrate in a sealing manner. A dummy electrode is provided outside the outermost one of the wiring electrodes.

In the thus-arranged display device, even if a shorting phenomenon occurs at the outer end of the wiring electrode array when the wiring electrodes are metallized by plating, there is substantially no possibility of occurrence of electrical shorting and there is no functional problem, since the dummy electrode is provided at the outermost end of the wiring electrode group.

Further, the spacing between the dummy electrode and the outermost wiring electrode is equal to or smaller than the spacing between the outermost wiring electrode and the inner wiring electrode next to the outermost wiring electrode.

Thus, a shorting phenomenon, if any, occurs only between the dummy electrode and the adjacent wiring electrode, and occurrence of a short circuit between the inner wiring electrodes can be prevented.

A display device in accordance with a third embodiment of the present invention includes: an insulating substrate on which display electrodes are formed; an opposing substrate opposed to the insulating substrate; a display material contained in a spacing between the insulating substrate and the opposing substrate in a sealing manner; a semiconductor chip for supplying signals to the display electrodes; a group of pads arranged on the insulating substrate so as to correspond to connection terminals of the semiconductor chip; and a group of check pads arranged in a straight row.

The display device is thus arranged to be capable of being checked with a straight probe, and such a probe can be manufactured at a low cost. Also, a standard probe can be designed to check various display devices formed in accordance with the present invention.

Some of the group of pads corresponding to the semiconductor chip terminals form a part of the group of check pads. The display device is thus arranged to be checked with a straight probe and to reduce the size of the insulating substrate by setting the mounted position of the semiconductor chip closer to the step formed by the substrates (in the vicinity of a line along which a plane defining the end surface of the opposing substrate meets the surface of the insulating substrate).

Embodiments of the present invention will be described below with reference to the accompanying drawings.

Embodiment 1

Figure 1B:
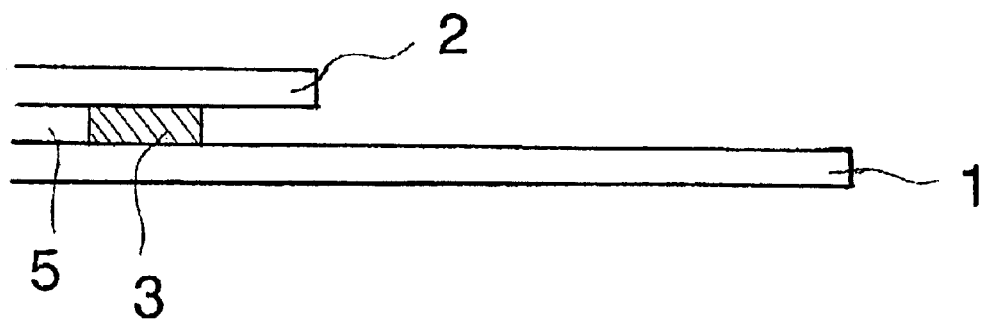
FIG. 1B is a schematic cross-sectional view of the liquid crystal display element shown in FIG. 1A.
Figure 2A:
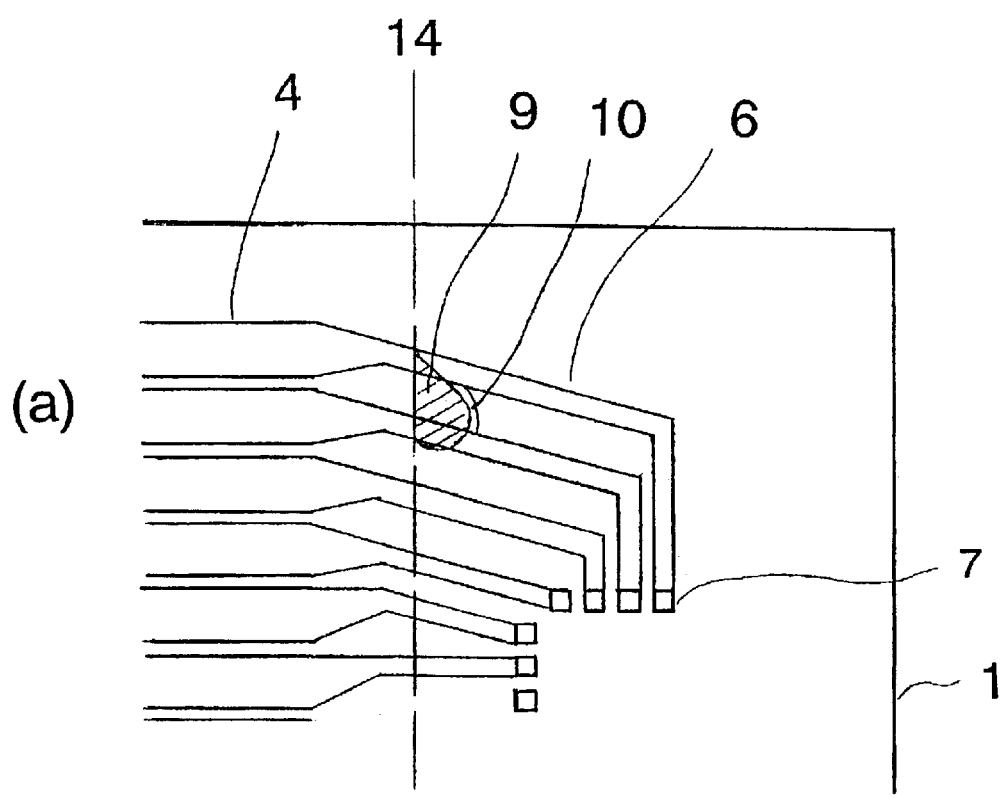
FIG. 2A is a schematic top view of a glass substrate 1 constituting a conventional liquid crystal display element.
Figure 2B:
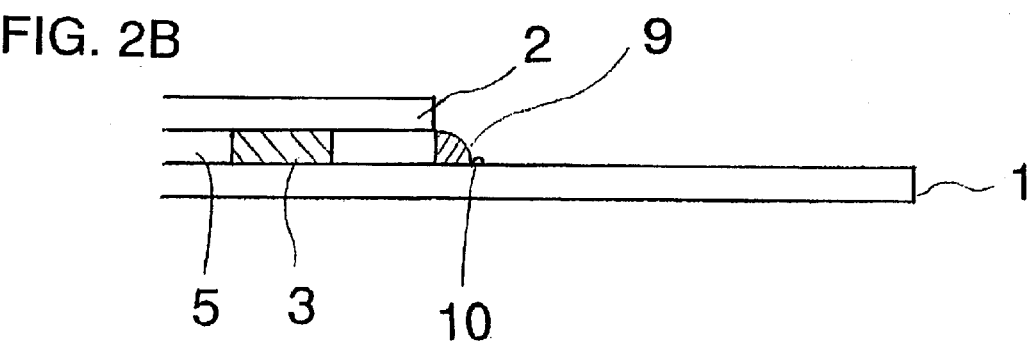
FIG. 2B is a schematic cross-sectional view of the conventional liquid crystal display element.

FIGS. 1A and 1B schematically show an example of a liquid crystal display element of the present invention. A glass substrate 1 is used as an insulating substrate, and transparent electrodes formed of an ITO film are formed on a surface of the glass substrate 1. FIG. 1A is a top view of the glass substrate 1 constituting the liquid crystal display element, and FIG. 1B is a cross-sectional view of the liquid crystal display element. The transparent electrodes are formed by patterning in predetermined shapes according to display contents to be displayed. Portions of the transparent electrodes are sorted as display electrode portions 4 and wiring electrode portions 6 according to their functions.

If a black-and-white full dot matrix type liquid crystal display device is formed, the electrode pitch between the display electrode portions 4 is about 0.3 to 0.4 mm. On the other hand, the electrode pitch of input and output terminals of a semiconductor chip mounted in the COG manner is about 0.05 to 0.10 mm. Therefore, it is necessary for the wiring electrodes 6 connecting the display electrode portions 4 and pads 7 corresponding to the terminal electrodes of the semiconductor chip to fill the difference between the pitches of the display electrodes 4 and the pads 7. In this embodiment, the group of wiring electrodes 6 are formed on the glass substrate 1 so as to be perpendicular to an end surface of an opposing substrate 2 at a portion 8 of the glass substrate 1 at which the wiring electrodes 6 extend across the end surface of the opposing substrate 2. If a semiconductor chip is mounted on the opposing substrate 2, wiring electrodes (not shown) are also formed by patterning on the opposing substrate 2 so as to be perpendicular to an end surface of the glass substrate 1 at a portion of the opposing substrate 2 at which the wiring electrodes extend across the end surface of the glass substrate 1.

Thus, the wiring electrodes 6 are formed by patterning on the glass substrate 1 so that each is perpendicular to the end surface (a contour line of the opposing substrate) of the opposing substrate 2 at the portion 8 at which the wiring electrodes 6 extend across the end surface of the opposing substrate 2 (the contour line of the opposing substrate). Therefore, a plating liquid cannot easily remain on the portion B of the glass substrate 1 at which the wiring electrodes 6 extend across the end surface of the opposing substrate 2, thus preventing occurrence of bridging of nickel thin film between the wiring electrodes 6.

The method of manufacturing a display device having the above-described configuration will be described. Two insulating substrates on which display electrodes and wiring electrodes are formed by patterning are attached to each other by a sealing material 3, with a spacing of 5 to 7 μm set therebetween. A liquid crystal 5 is injected into the spacing and contained in the same in a sealing manner. If a plurality of groups of display elements for a plurality of display devices are arranged on the insulating substrates, corresponding liquid crystal panels may be separated by forming scribe lines in the insulating substrates along the contours of the liquid crystal panels by using a superhard roll, a diamond cutter or the like, before the liquid crystal is injected. As described above, all the wiring electrodes 6 are formed on the glass substrate 1 so as to be perpendicular to the end surface of the opposing substrate 2 at the portion 8 at which the wiring electrodes 6 extend across the end surface of the opposing substrate 2.

Next, the wiring electrode portions on the glass substrate 1 exposed outside the liquid crystal panel are selectively plated by nonelectrolytic nickel plating. More specifically, the liquid crystal panel is washed by water and is immersed in an alkaline solution, such as a sodium hydroxide solution, for degreasing. Based on an ordinary method, a precious metal catalyst, such as palladium, is attached to the surfaces of the wiring electrodes, and the liquid crystal panel is immersed in a nonelectrolytic nickel liquid containing phosphoric acid used as a reducing agent. A nickel-phosphorus coat (hereinafter referred to as nickel coat or nickel film) is thereby precipitated on the wiring electrodes. At this time, the plating liquid does not remain at the step formed by the insulating substrates, since the wiring electrodes 6 on the glass substrate 1 are perpendicular to the end surface of the opposing substrate 2 at the portion of the glass substrate 1 at which the wiring electrodes 6 extend across the end surface of the opposing substrate 2. Therefore, no nickel thin film bridge forms between the connecting electrodes 6. The same can also be said with respect to connection electrodes on the opposing substrate 2.

Then, a gold coat is precipitated on the nickel coat. More specifically, after washing in water which follows nickel plating, the liquid crystal panel is immersed in a substitution-type nonelectrolytic gold plating liquid to substitute the surface of the nickel coat for metal gold, thereby forming a gold coat. After washing in water, the coat is annealed at 120° C. for an hour. By annealing, the hardness and adhesion of the plating film are improved.

On the liquid crystal panel in which the surfaces of the terminal electrodes of the display element are metallized by plating, a semiconductor chip for applying drive voltages to the display electrodes is mounted by being connected to pads 7 on the glass substrate 1 by a connecting material, such as anisotropic conductive film (ACF), based on an ordinary method. Before mounting, a polarizing plate is attached, if necessary, over the display area of the insulating substrates where electrode patterns are formed. In the above-described manner, a display device is obtained in which semiconductor chips are mounted on the glass substrate based on the COG method.

If the surfaces of transparent electrodes are metallized as described above, it is preferable to use an ITO film formed by an electron beam (EB) method to have a rough surface. This is because a metallic catalyst can attach easily to a rough ITO film surface, and because such an ITO film can therefore be metallized more effectively than an ITO film formed by sputtering to have a smooth surface. That is, as the transparent electrode, an ITO film formed by an EB method is preferred rather than an ITO film formed by sputtering.

Embodiment 2

Figure 3A:
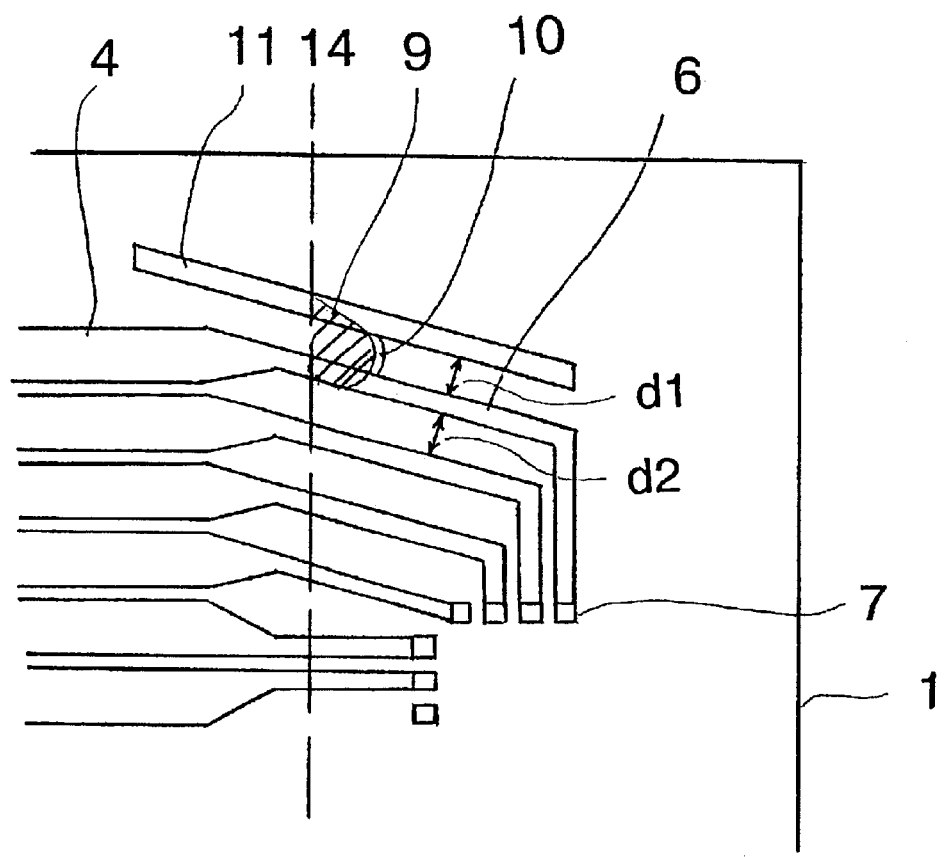
FIG. 3A is a schematic top view of a glass substrate constituting a liquid crystal display element in accordance with a second embodiment of the present invention.
Figure 3B:
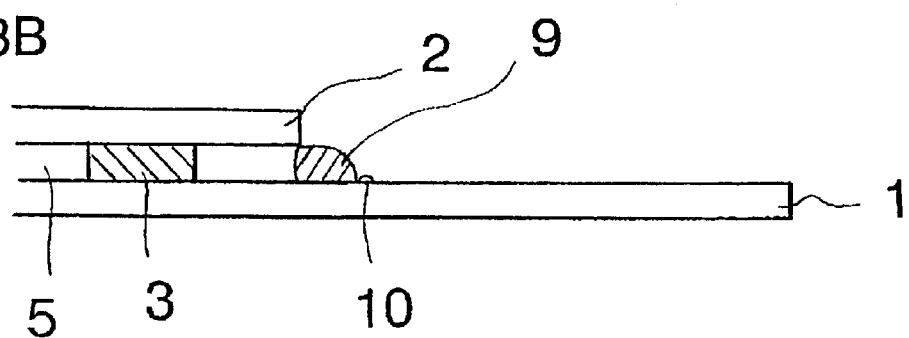
FIG. 3B is a schematic cross-sectional view of the liquid crystal display element shown in FIG. 3A.

FIGS. 3A and 3B schematically show a liquid crystal display element in accordance with a second embodiment of the present invention. FIG. 3A is a top view of a glass substrate 1, and FIG. 3B is a cross-sectional view of the liquid crystal display element.

Transparent electrodes 4 formed of an ITO film are formed on a surface of the glass substrate 1 provided as an insulating substrate. The transparent electrodes 4 are formed by patterning in predetermined shapes, and portions of the transparent electrodes are sorted as display electrode portions 4, wiring electrode portions 6, and pads 7 according to their functions.

Since the pitch with which the pads 7 corresponding to terminal electrodes of a semiconductor chip and the pitch with which the display electrode portions 4 are arranged differ from each other, the wiring electrode portions 6 that connect the pads and the display electrode portions 4 are patterned obliquely. That is, on a portion of the glass substrate 1 at which the wiring electrode portions 6 extend across an end surface of an opposing substrate 2, the wiring electrode portions 6 are formed obliquely with respect to the end surface of the opposing substrate 2. Similarly, wiring electrodes (not shown) on the opposing substrate 2 are also patterned obliquely with respect to an end surface of the glass substrate 1 at a portion of the opposing substrate 2 at which the wiring electrodes extend across the end surface of the glass substrate 1. In this embodiment, a dummy electrode 11 is formed outside the wiring electrodes 6.

Ordinarily, as described above, a plating liquid 9 can remain easily between the outermost connecting electrode in the electrode group and another of the connecting electrodes adjacent to the outermost one on the glass substrate portion in the vicinity of the end surface of the opposed electrode, and a bridge 10 of a nickel thin film is liable to form along the periphery of the mass of remaining plating liquid 9. In the arrangement of the present embodiment, a nickel thin film bridge 10 may form between the dummy electrode 11 outside the electrode group and the adjacent connecting electrode 6. However, since one of the two electrodes between which a bridge may form is a dummy electrode, there is substantially no possibility of occurrence of electrical shorting, and there is no functional problem.

As wiring electrodes 6, some electrode groups may be formed depending upon electrode layout artwork. For example, if a plurality of semiconductor chips are mounted on the glass substrate, a plurality of corresponding groups of wiring electrodes are formed by patterning. In such a case, dummy electrodes may be formed outside the opposite-end wiring electrodes in each group.

The distance d1 between the dummy electrode and the wiring electrode adjacent to the dummy electrode may be equal to the distance d2 between the outermost wiring electrode (the wiring electrode adjacent to the dummy electrode) and the inner wiring electrode next to the outermost wiring electrode, or may be set to a value smaller than d2 to make the dummy electrode more effective.

Preferably, the dummy electrode 11 is formed parallel to the outermost wiring electrode. Preferably, the dummy electrode 11 is formed so that at least the inner adjacent pair of the lengthwise pattern contour lines of the wiring electrode and the dummy electrode are parallel to each other.

The width of the dummy electrode may be the same as or larger than the width of the wiring electrode. Also, a plurality of dummy electrodes may be provided. If a plurality of dummy electrodes are formed, the distance between the outermost dummy electrode and the group of wiring electrodes is substantially large, so that the possibility of occurrence of a short circuit between the wiring electrodes is reduced.

Preferably, the area of the glass surface outside the outermost wiring electrode is reduced by increasing the width of the dummy electrode or by forming a plurality of dummy electrodes, thereby increasing areas occupied by transparent electrodes. If the length of the dummy electrode is so small that the dummy electrode only reaches a point on the glass substrate in the vicinity of the end surface of the opposing substrate, the effect of the dummy electrode is inadequate. Accordingly, it is necessary to sufficiently extend the dummy electrode 11 outward from the end surface of the opposing substrate 2 (toward the contour line of the glass substrate), as shown in FIG. 3A.

Embodiment 3

Figure 4A:
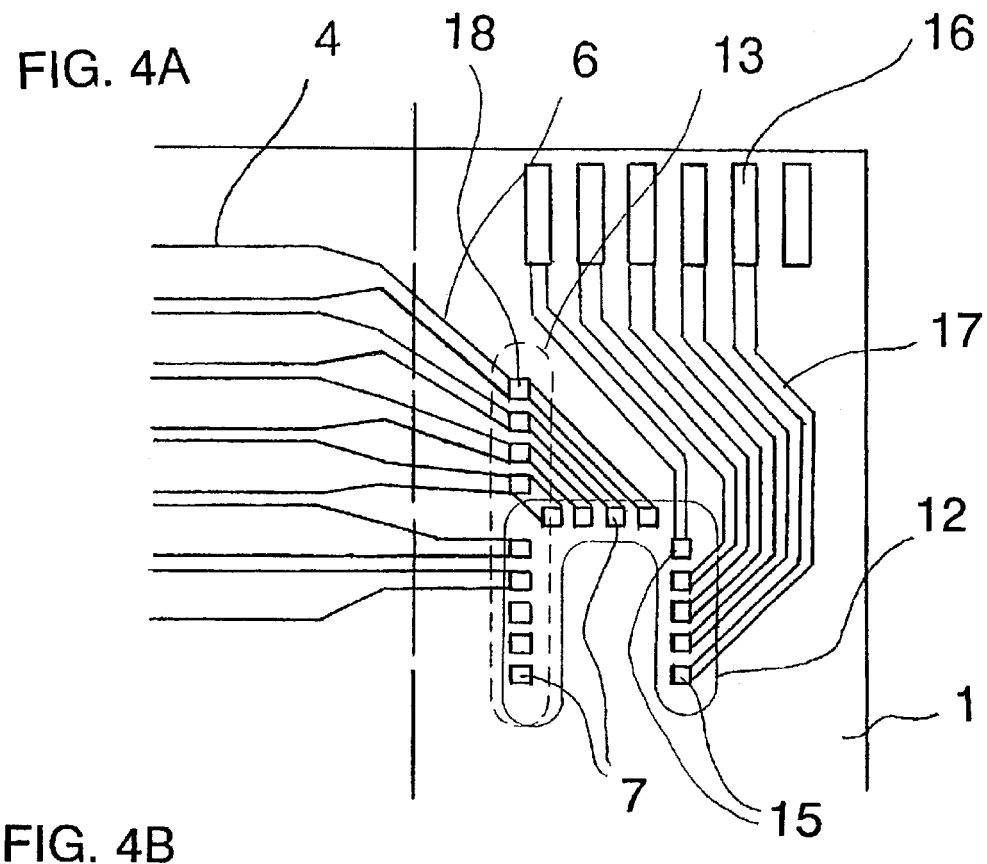
FIG. 4A is a schematic top view of a glass substrate constituting a liquid crystal display element in accordance with a third embodiment of the present invention.
Figure 4B:
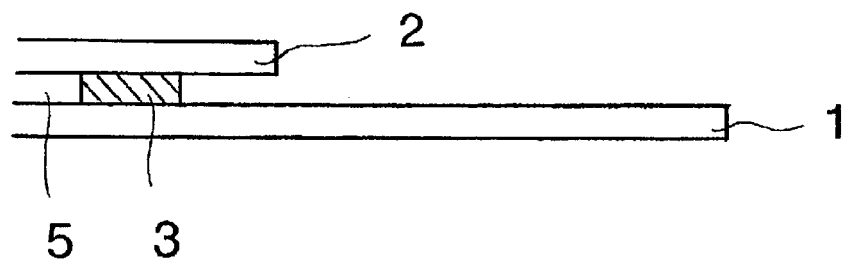
FIG. 4B is a schematic cross-sectional view of the liquid crystal display element shown in FIG. 1A.

FIGS. 4A and 4B schematically show a liquid crystal display element in accordance with a third embodiment of the present invention. FIG. 4A is a top view of a glass substrate 1 constituting the liquid crystal display element, and FIG. 4B is a cross-sectional view of the liquid crystal display element. Transparent electrodes patterned on predetermined shapes are formed on a surface of the glass substrate 1 used as an insulating substrate. Portions of the transparent electrodes are sorted as display electrode portions 4, wiring electrode portions 6, and a pad group 12 according to their functions. Pads in the pad group 12 are formed so as to correspond to terminal electrodes of a semiconductor chip. Ordinarily, terminal electrodes of semiconductor chips are disposed so as to have a tetragonal configuration. If the semiconductor chip to be mounted has such a terminal electrode configuration, the pad group 12 is also arranged in a corresponding tetragonal configuration, as illustrated. The terminal electrodes of the semiconductor chip include input terminals for inputting signals to the internal circuit of the semiconductor chip, and output terminals for outputting drive signals to the display electrodes. Accordingly, the pad group 12 formed on the glass substrate 1 includes pads 7, which are arranged so as to correspond to the output terminals of the semiconductor chip, and input pads 15, which are formed so as to correspond to the input terminals of the semiconductor chip. Wiring electrode portions 6 are formed by patterning to electrically connect the pads 7 and the display electrode portions 4. Input wiring electrodes 17 are also formed by patterning to electrically connect the input pads 12 and external connection terminals 16 for connection to an external controller.

In this embodiment, check pads 18 are provided between the display electrode portions 4 and the pads 7. The wiring electrode portions 6 are provided for electrical connection between the display electrode portions 4 and the check pads 18, and for electrical connection between the check pads 18 and the pads 7. The check pads 18 are arranged in a straight row to form a check pad group 13. A short-circuit check probe is brought into contact with each check pad in the check pad group 13 to check a short circuit between the electrodes. Since the check pad group 13 has a straight configuration, the check probe may be straight in shape, so that the probe itself can be manufactured at a low cost. Also, for alignment of the check pads 18 and the check probe, only positioning in the horizontal direction as viewed in FIG. 4A (parallelizing adjustment) may suffice. Alignment of this probe can be easily performed in comparison with alignment of a tetragonal probe, which requires parallelizing adjustment in two directions. In use of the probe, liquid crystal drive voltages may be applied through the probe between the display electrodes 4 on the glass substrate 1 and the display electrodes on the opposing substrate 2 to check display appearances or the like.

Further, the arrangement may be such that the pitch for arrangement of check pads and the number of check pads are standardized, a corresponding standard probe is prepared, and check pad group 13 is provided on the glass substrate 1 in accordance with this standard, thereby ensuring that, even if the configuration of semiconductor chip terminal electrodes is changed by a change of the chip type or the like, the same check probe, i.e. the standard probe, can be used to check a short circuit between electrodes without change in the check probe.

In the example of configuration shown in FIG. 4A, the check pad group 13 is formed by arranging the check pads 13 in a straight row in combination with a certain number of pads in the pad group 12. If some of pads 7 are also used as check pads in the above-described manner, the advantage of standardization of the probe may be lost. However, such an arrangement is effective in satisfying a demand for minimizing the size of the glass substrate 1. That is, to bring the probe into contact with the check pads, the check pad group 13 needs to be formed at a certain distance from the end surface of the opposing substrate 2. If no pads 7 are used as check pads, the check pad group 13 is provided internally relative to the pads 7. In such a case, the position at which the semiconductor chip is mounted (i.e., the position of the pad group 12) is shifted toward the edge of the glass substrate 1, and the size of the glass substrate 1 is correspondingly increased.

The method of manufacturing the display device by using the glass substrate having transparent electrodes patterned on the above-described configuration is the same as that in the above-described embodiment, and the description for it will be omitted.

This embodiment has been described with respect to the pad group 12 including pads 7 arranged so as to correspond to output terminals of a semiconductor chip, and input pads 15 formed so as to correspond to input terminals of the semiconductor chip. In the above-described first and second embodiments, however, patterns may be formed in the same manner as those in this embodiment, for the mounting of a semiconductor chip on the glass substrate. Power supply pads in the input pads 15 and corresponding wiring portions, in particular, need to be metallized.

An example of a supertwisted nematic (STN) type of liquid crystal display device has been described as each of the first to third embodiments of the present invention. However, the liquid crystal in the display device of the present invention may be of any other type, e.g., a twisted nematic (TN) type or a polymer dispersion type. If a pattern configuration which is a combination of the configuration in the first embodiment and the dummy pattern described in the description of the second embodiment is used, occurrence of a short circuit by metallization can be prevented more reliably. Also, the check pad group described with respect to the third embodiment may be added to the configuration of the first or second embodiment to enable metallization without a risk of short-circuiting as well as to facilitate checking.

The display device of the present invention may be either a type of COG display device in which connection electrodes on the opposing substrate are connected by common members in the liquid crystal panel to points on the other insulating substrate, or another type of COG display device in which semiconductor chips are mounted on the two insulating substrates, as are those in the above-described embodiments.

In the display device of the present invention, the possibility of occurrence of a short circuit between connecting electrodes, resulting in a functional failure, can be reduced. Also, a dummy electrode is provided to avoid a functional failure even when a bridging short circuit occurs. A straight row of check pads is provided and, therefore, a straight probe suffices for checking. Such a probe can be manufactured at a low cost. At the time of checking, alignment of the check probe with the check pads requires only parallelizing adjustment in one direction and can therefore be performed more easily in comparison with alignment of a tetragonal probe requiring parallelizing adjustment in two directions. The desired accuracy thereof can be easily maintained during checking, and the tooling can be easily changed.

What is claimed is:

1. A display device comprising:
    an insulating substrate on which display electrodes and connection pads are formed, the connection pads including input pads and output pads arranged in a tetragonal configuration, the output pads being formed at least at two adjacent sides of the tetragonal configuration;
    an opposing substrate opposing the insulating substrate with a gap therebetween;
    a display material contained in the gap between the insulating substrate and the opposing substrate in a sealed manner;
    check pads formed on the insulating substrate and provided in a straight row between the display electrodes and the output pads; and
    wiring electrodes for electrically connecting the display electrodes to the check pads and connecting the check pads to the output pads.

2. A display device according to claim 1; wherein at least one of the output pads serves as a check pad.

3. A display device according to claim 1; wherein the display electrodes comprise transparent electrodes formed on the insulating substrate, and the wiring electrodes comprises a metal film-formed on the transparent electrodes outside a display portion thereof.

4. A display device according to claim 3; wherein the metal film is formed is nonelectrolytic nickel plating.

5. A display device according to claim 3; wherein the transparent electrodes are formed of ITO.

6. A display device according to claim 1; wherein the display electrodes are transparent electrodes, and the wiring electrodes are formed by plating only portions of the transparent electrodes extending beyond a side edge of the opposing substrate.

7. A display device comprising:
    a transparent substrate having display electrodes, wiring electrodes and connection pads, the connection pads including input pads and output pads arranged to correspond to a terminal layout of a semiconductor chip, wherein the connection cads are arranged in a tetragonal configuration, and the output pads are formed on at least two adjacent sides of the tetragonal configuration;
    an opposing substrate opposing the transparent substrate with a gap therebetween, the transparent substrate extending beyond an end of the opposing substrate, and the connection pads being formed on the transparent substrate beyond the end of the opposing substrate;
    a display material sealed in the gap;
    check pads formed on the transparent substrate between the display electrodes and a portion of the output pads; and
    a check pad group including the check pads and other ones of the output pads;
    wherein the pads of the check pad group are arranged in a straight row.

8. A display device according to claim 7; wherein the display electrodes comprise transparent electrodes formed on the transparent substrate and the wiring electrodes comprise a metal film formed on the transparent electrodes outside a display portion thereof.

9. A display device according to claim 8; wherein the metal film is formed by nonelectrolytic nickel plating.

* * * * *